US005629362A

United States Patent [19]
Arena

[11] Patent Number: 5,629,362
[45] Date of Patent: May 13, 1997

[54] PHOTON DIFFUSIVE COATING

[75] Inventor: Paul R. Arena, Pompano Beach, Fla.

[73] Assignee: Heatshield Technologies Inc., Popano Beach, Fla.

[21] Appl. No.: 455,553

[22] Filed: May 31, 1995

[51] Int. Cl.$^6$ .................... B22C 1/00; C04B 14/04
[52] U.S. Cl. .................... 523/139; 523/141; 524/56; 524/431; 106/442; 106/483; 423/334
[58] Field of Search .................... 252/62, 501.1, 252/506, 507; 106/436, 442, 481; 524/492, 56, 431; 523/139, 141; 501/4; 423/334, 332

[56] References Cited

U.S. PATENT DOCUMENTS

| | | | |
|---|---|---|---|
| 4,093,017 | 6/1978 | Miller, Jr. et al. | 164/28 |
| 4,234,347 | 11/1980 | Kirilishin | 106/286.7 |
| 4,629,507 | 12/1986 | Fukushima | 524/4 |
| 4,818,729 | 4/1989 | Perrotta et al. | 501/4 |
| 5,000,033 | 3/1991 | Novotny et al. | 423/334 |
| 5,084,262 | 1/1992 | Novotny et al. | 423/332 |
| 5,368,950 | 11/1994 | Kokuta et al. | 423/332 |

*Primary Examiner*—Tae Yoon
*Attorney, Agent, or Firm*—St. Onge Steward Johnston & Reens

[57] ABSTRACT

Photon-diffusive coating compositions contain a binder and a mineral containing at least about 65%, preferably at least about 75%, and most preferably at least about 85% to 90% silica, of which at least about 60%, preferably at least about 75% to 85% is in the crystal form of cristobalite, which has been reacted with sodium hydroxide. In typical embodiments, ground Klannerite® is reacted with sodium hydroxide in an aqueous slurry by the application of heat to just below the boiling point until the pH falls to below 12, and then a latex binder is added. Preferred binders comprise a mixture of polysaccharide resin and a latex binder; the polysaccharide resin is added, the mixture is neutralized somewhat, and then the latex binder is added. The viscosity of the final composition may be adjusted by adding water. Cured coatings exhibit good spectral reflectance and are useful in a variety of applications such as coating furnace interiors.

18 Claims, 1 Drawing Sheet

PHOTON DIFFUSIVE COATING

TECHNICAL FIELD

This invention is related to photon diffusive materials for use as heat-resistant coatings. When applied to the interior of furnaces and the like, the coatings reflect radiant energy back into the furnace, thereby improving the rate of the heat transfer to the charge and reduce overall energy usage.

BACKGROUND OF THE INVENTION

Dispersive coatings reflect spectral radiation with negligible absorption. Such coatings can be used on furnace interiors for the purpose of increasing fuel efficiency or productivity and for various other applications such as refractory furnace installations, fire screens, hot air ducts, and the like.

A number of reflective coatings have been described. These typically are metal or metal compounds. For example, in U.S. Pat. No. 4,563,843, Grether, et al., suggest silver, gold or copper infra-red reflecting coating as a component of a heat insulation window (column 4, lines 53 to 55).

Laing, et al., disclose a fire resistant enclosure in U.S. Pat. No. 4,174,711. The wall has a reflective layer for infra-red radiation (column 3, line 49). Chromium plating was suggested for this coating, but galvanization in which the outwardly directed surface carries an extremely thin deposit of gold was preferred (id., lines 61 to 68).

In U.S. Pat. No. 4,137,198, Sachs describe a polymer-inorganic hybrid foam comprised of a continuous plastic phase or backbone structure of unexpanded polymer such as polyvinyl acetate, vinyl-acrylic copolymer or asphalt or bituminous pitch, having distributed therein particles of an inorganic phase such as Portland cement or gypsum particles (column 2, lines 7 to 17). The foam was suggested to be useful as a fire-resistant, thermally-insulating construction material (id., lines 40 to 42). At flame temperatures, in some embodiments the surface of the composition developed infrared reflective chromophores from the decomposition of the foam, which acted as mirrors reflecting rays from the surface back to the source of the flame (column 12, lines 21 to 29).

Nolte, et al., disclose a laminated light-transmitting fire screen panel in U.S. Pat. No. 4,104,427. An infra-red reflective coating of a noble metal, copper, aluminum or an oxide may be applied to the vitreous sheet face of the panel (column 4, lines 60 to 63), to help protect it and increase the time taken for the layer to intumesce on the outbreak of a fire.

A similar fire screen glazing panel containing granular intumescent material is described by DeBoel in U.S. Pat. No. 4,268,581. The panels can be coated with an anhydrous metal compound such as zirconium oxide, aluminum phosphate, titanium oxide or tin oxide (column 4, lines 42 to 45 and 60 to 63). Alternatively or in addition, an infra-red reflecting coating of a noble metal, copper, aluminum or an oxide may be applied to protect the intumescent material against radiation absorption and increase the time taken for the layer to intumesce (column 4, line 66 to column 5, line 8).

It would be desirable to have alternate photon-diffusive coatings, particularly more economical coatings than those using expensive noble metals.

SUMMARY OF THE INVENTION

It is an object of the invention to provide a new photon-diffusive coating.

It is a further and more specific object of the invention to provide a new photon-diffusive coating that exhibits good electromagnetic reflectance, and is economical and easy to apply.

These and other objects are achieved by the present invention which describes a photon-diffusive coating composition containing silica having high amounts of cristobalite reacted with sodium hydroxide and a binder. Preferred silica compositions comprise Klannerite®, which contains about 88% silica in the polymorphic crystalline form of cristobalite in an amount of 75% to 85%, and about 10% alumina.

In typical embodiments, ground Klannerite® is reacted with sodium hydroxide in an aqueous slurry by the application of heat to just below the boiling point until the pH falls to below 12; in typical embodiments, the temperature ranges from about 120° F. to about 250° F. and, in one embodiment, about 185° F. The weight ratio of Klannerite® to sodium hydroxide varies between about 4:1 to 5:1, more narrowly about 4.5:1, in some embodiments.

An opacifier such as titanium dioxide may, optionally, be added to the reaction mixture prior to the application of heat. In some of these embodiments, the weight ratio of Klannerite® to opacifier ranges between about 5.5:1 to about 4.5:1.

After heating, a binder is added to the composition so that it can be made to spread onto surfaces. The binder is typically latex, and most compositions of the invention further comprise a polysaccharide resin.

In many embodiments, photon-diffusive coating compositions are prepared by reacting Klannerite® with sodium hydroxide in the presence of opacifier as described above, and then adding a polysaccharide resin, neutralizing the mixture somewhat, and then adding a latex binder. In some embodiments, the weight ratio of Klannerite® to polysaccharide resin varies from about 6:1 to 7:1 and the weight ratio of Klannerite® to latex binder varies from about 1:1 to 1.5:1. In one embodiment, sodium sesquicarbonate is the neutralization agent added to the composition prior to the latex binder, at levels of sodium hydroxide to sesquicarbonate weight ratio between about 25:1 and 35:1 by weight.

The coatings are typically force-dried at an elevated temperature to cure them. Preferred curing processes drive off the water slowly, so that the surface sets up like a ceramic. As described in greater detail below, in some embodiments, coatings are cured by heating in multi-stage temperature increments of 200° F., 500° F., and 1000° F. at intervals of about an hour. Preferred coating compositions of the invention so prepared and applied to exhibit a total spectral reflectance greater than 70%, more preferably greater than 80%, at wavelengths of 0.5 to 5.0 microns.

Methods of making photon-diffusive coatings are also disclosed.

DETAILED DESCRIPTION OF THE INVENTION

Figure 1:
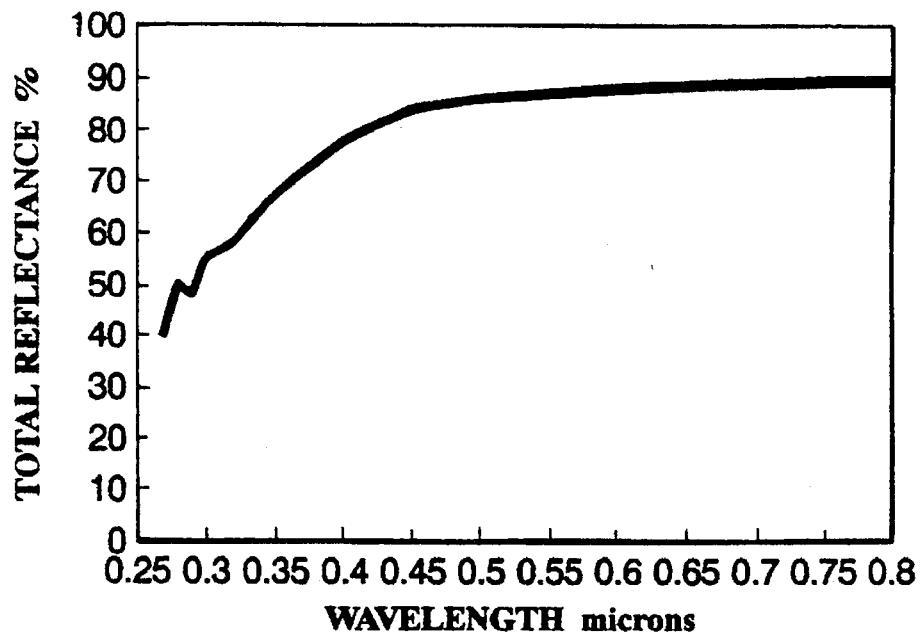
FIG. 1 is a plot of measured reflectance of radiation energy versus wavelength for photon-diffusive coatings of the invention.

This invention is based upon the finding that Klannerite®, a unique mineral containing a high percentage of cristobalite, a high temperature polymorph of silica (SiO$_2$), is useful in photon-diffusive coatings.

Crystalline silica may exist in several different polymorphic forms corresponding to different ways of combining the silicon tetrahedral groups with corners shared. Three basic structures each exist in two or more modifications. The most stable forms are low quartz (below 573° C.), high quartz (573° to 867° C.), high tridymite (867° to 1470° C.), high cristobalite (1470° to 1723° C.), and a liquid (above 1723° C.). The inversion or transformation from the low form to the high form, called displacive, involves only minor distortions of the structure and consequently takes place instantaneously with a change in temperature at the inversion temperature. The transformation from one form to another, such as quartz to tridymite to cristobalite involves reorganization of the basic structure and hence takes place extremely slowly. The latter is called a reconstructive transformation. If silica in the crystalline form of quartz is exposed to a high temperature, e.g., above 1470° C. for an extended period of time, causing cristobalite to form, on rapid cooling this high cristobalite phase will invert to low cristobalite rather than return to the quartz structure. While not wishing to be bound to any theory, it appears that the unique array, crystal size, geometry, and orientation of polymorphic crystalline silica in Klannerite® is largely responsible for the unusual properties of the photon diffusive coatings of this invention.

Klannerite® is a naturally occurring material found in a deposit in Mojave County, Ariz. It contains approximately 88% silica (SiO$_2$), in the polymorphic crystalline form of cristobalite in the amount of 75% to 85%, and about 10% alumina (Al$_2$O$_3$). Accessory minerals include quartz (glassy or crystalline native SiO$_2$) and kaolinite (Al$_2$O$_3$.2SiO$_2$.H$_2$O) with lesser amounts of tridymite (SiO$_2$), bentonite and zeolitic minerals, the latter being similar to montmorilanite. A chemical analysis and summaries of mineral and physical properties are given hereafter.

Klannerite® is used in preferred embodiments, but any silica composition having a high concentration of cristobalite crystal forms can be used in the practice of the invention. Preferred silica compositions contain at least about 65%, preferably at least about 75%, and in some cases 85% to 90%, silica. One particularly preferred embodiment contains about 85% to 90% silica. At least about 60%, preferably at least about 70%, of the silica in the silica composition is in the form of cristobalite. One particularly preferred embodiment contains about 75 to about 85% cristobalite in the silica component. The remainder of the composition contains other minerals. In one embodiment, the composition contains about 10% alumina. Examples are given hereinafter.

The crystalline phases present in Klannerite® and similar silica compositions containing high amounts of cristobalite are inert, fire resistant, and will not support combustion. The mineral has a natural microporosity more fully described in the Examples. In one study, for example, 10% of the pores were found to be larger than 10 microns, 27% larger than 1 micron, and 59% larger than 0.1 micron, with 100% larger than 0.01 micron. In the practice of the invention, Klannerite® is ground into a fine powder for use in coating compositions.

Generally, the milling and combining process provides a distribution of particle sizes that yield a molecular lattice structure within the individual molecules of the Klannerite® in the final coating. Klannerite® processing forms a closely-packed crystal structure, providing the desired reflectance of infra-red and other spectral energy.

In the practice of the invention, photon-diffusive coating compositions are prepared by reacting ground Klannerite® with a strong base and then a adding a binder. Preferred bases include sodium or potassium hydroxide or mixtures of these. In typical emobidments, Klannerite® is reacted with sodium hydroxide in an aqueous slurry by the application of heat to just below the boiling point, e.g., temperatures of from about 120° F. to about 250° F., until the pH falls to below 12. In one embodiment, the mixture is heated to about 185° F. The weight ratio of Klannerite® to sodium hydroxide in most embodiments varies between about 4:1 to 5:1, and more narrowly about 4.5:1 in one embodiment.

In some embodiments, an opacifier such as titanium dioxide, e.g., Rutile, may be added to the Klannerite®/sodium hydroxide mixture prior to heating. In some embodiments, the weight ratio of Klannerite® to opacifier ranges from about 5.5:1 to 4.5:1; in one embodiment, the weight ratio is 4.9:1.

A binder is then added. Preferred binders are latex, and mixtures of polysaccharide resins and latex binders are particularly preferred. In an example embodiment, a polysaccharide resin such as Lorcon® is added and then a latex binder such as Airflex® (vinyl acetate and ethylene polymers) is added. Preferably, the mixture is neutralized somewhat between these additions with a compound such as sodium sesquicarbonate. In many embodiments, the weight ratio of sodium hydroxide to sodium sesquicarbonate varies from about 25:1 to 35:1; a ratio of 29:1 is employed in some embodiments. Water may be added to the final composition to adjust the viscosity.

In some embodiments, the weight ratio of Klannerite® to polysaccharide resin varies from about 6:1 to 7:1 and the weight ratio of Klannerite® to latex binder varies from about 1:1 to 1.5:1. A weight ratio of Klannerite® to polysaccharide resin of about 6.2:1 and a weight ratio of Klannerite® to latex binder of about 1.3:1 is employed in one embodiment.

In an example preparation, a photon-diffusive coating of the invention is prepared by the process of reacting ground Klannerite® and sodium hydroxide in a weight ratio of about 4.5:1 in an aqueous slurry held at about 185° F. until the pH of the slurry falls below about 12 with a titanium dioxide opacifier at a weight ratio of Klannerite® to opacier ranging between about 4.5:1 to 5:1; adding a polysaccharide resin to the mixture at a weight ratio of Klannerite® to resin ranging from about 6:1 to about 6.5:1 and mixing; adding sodium sesquicarbonate in a weight ratio of sodium hydroxide to sesquicarbonate ranging from about 25:1 to 30:1 and mixing; and then adding a latex binder in a weight ratio of Klannerite® to binder ranging from about 1.5:1 to 1:1 and mixing. A specific procedure is given in the examples that follow.

The photon diffusive coatings of this invention can be applied to any refractory surface in any manner appropriate to normal paints. The recommended method is by commercial air sprayer, but it can be brushed or rollered onto the surface. It can be used with or without dilution with water, and can be applied to both cold and hot surfaces (up to 400° F.).

Prior to applying the coating to a surface, the surface is preferably prepared by removing loose materials, oils, and grease. For aluminum surfaces, prior acid etching is recommended. Except for magnesia or other basic brick surfaces, photon-diffusive coatings are particularly adapted to brick or other non-reactive substrates.

The coatings are typically cured after application, by subjecting the coating to 200° F., 500° F., and 1000° F.

temperatures at one hour intervals that drive off the water slowly and sets up the surface like a ceramic. Preferred dry coatings are range in thickness from about 9 to about 20 mils. It is an advantage of the invention that the coatings exhibit good spectral reflectance and heat-resistance. Typical coatings exhibit a total spectral reflectance of of greater than 70%, preferably greater than 80%, and in some cases, greater than 85%, at wavelengths of 0.5 to 0.8 microns. Preferred compositions exhibit high reflectivities in the 0.5 to 5.0 micron range, so the coatings are highly effective for reflective radiant energy at high temperatures. In some embodiments, reflectivities vary between 0.5 and 0.8 at 1200° to 2600° F., with savings of fuel use that increase exponentially at higher temperatures.

The invention is useful for a variety of applications including coating boiler interiors and exteriors, gas hoods, hot air ducts, refrigerated tanks and trucks, storage furnaces, annealing furnaces, Lehr furnaces, fire hearths, roof coatings, pool deck coatings, ship superstructures, public transportaion vehicles, train exteriors and interiors, rocket engines and spacecraft components, military armaments and systems, fire-safe corridors and building components. The coatings can be used on carbox furnaces, reheat furnaces, continuous furnaces, In/Out furnaces, car bottom furnaces, ladle melting furnaces, high heat furnaces, curing furnaces, glazing furnaces, and reheat furnaces. The coatings have applications in the steel industry, the ceramics industry, the aluminum industry, the power generation and petrochemical industry, glass industry, and the fireproofing industry.

When applied to the interior of a furnace, photon diffusive coatings reflect radiant energy back within the furnace, thereby improving the rate of heat transfer to the charge and reducing overall energy usage. Photon diffusive coatings exhibit high reflectance compared to normal refractories, and also give better temperature uniformity within the furnace, yielding improved furnace control and product quality. Example energy savings that have been observed in tests are given hereinafter.

It is an advantage of the invention that the coatings are easy to apply and very cost effective, offering a high rate of return on the investment. They yield substantial energy savings (illustrated in the Examples hereafter), and less atmospheric pollution is generated through reduced energy use. Furnace "cold spots" are reduced, and the life of refractory linings is increased by sealing cracks and reducing leakage. The coatings can be used neat, or as a base coat for subsequent fireproof or other coatings.

EXAMPLES

The following examples are presented to further illustrate and explain the present invention, and should not be taken as limiting in any regard. Unless otherwise indicated, all parts and percentages are by weight, and are based on the weight at the particular stage of the processing being described.

Example 1

A photon-diffusive coating of the invention is prepared in this example.

To a mixing vessel 733.04 lbs of water was added, followed by 376 lbs 50% sodium hydroxide and then 175 lbs Rutile® TiO$_2$ R-HO6X opacifier. To the mixture 853 lbs finely ground Klannerite® were added, the walls of the vessel were washed with 8.33 lbs water, and the mixture was mixed well as it was heated to 185° F. The mixer was turned off, 33.32 lbs water were added to cover the slurry, and the slurry was held at 185° F. for 24 hours.

After this holding period, the pH was checked. If it was above 12.0, the slurry was held at 185° F. for an additional 8 hours. More water may be added to keep the mixture covered. This procedure was repeated until the pH was under 12.

The mixture was cooled to 120° F., the mixer was turned on (low speed) and 137 lbs of Lorcon® JK-270, a polysaccharide resin, was added. A premix was formed by mixing 33.32 lbs water and 65 lbs sodium sesquicarbonate (NaHCO$_3$.Na$_2$CO$_3$.2H$_2$O, a neutralizing agent formed by reacting carbonic acid and a base) for five minutes, and this was slowly added to the batch. Afterwards, 657 lbs Airflex® 525BP, a latex binder is added, and then 74.97 lbs water were added to control viscosity.

Example 2

The reflectance properties of the coating of Example 1 are examined in this example.

A series of near ultraviolet (UV)-visible and infra-red (IR) reflectance scans were performed on dry coating and compared to a barium sulfate reference plaque using integrating sphere optics. The relative reflectance was quite high, ranging from over 50% at 250 nanometer wavelength in the UV to over 85% from 550 to 700 nanometers in the visible wavelength range. Other studies using different methodologies reported 90% reflection of infra-red and 85% reflectance of ultra-violet, respectively.

Coatings of the invention exhibit diffuse reflectance characteristics when measured by a Perkin Elmer FTIR instrument equipped with a TGS detector for detecting the reflected energy. Relative diffuse reflectance (measured with a front surfaced silver mirror as a reference) was greater than 60% in parts of the infra-red region. A buff aluminum sheet control had a reflectance of approximately 25% at 2000 nm, increasing to 70% at 12,000 nm under conditions of the same test.

A plot of total reflectance versus wavelength is given in FIG. 1. It can be seen that photon diffusive coatings of the invention reflect over 85% of the radiated energy on the wavelengths over the 0.5 micron level. Thus, coatings of the invention are highly effective for reflecting radiant energy.

Example 3

The properties of the photon diffusive coating prepared in Example 1 are examined in this example.

The coating mixture was diluted with deionized water in a range of 3 to 4 parts water to one part mixture. The diluted mixture, which had a pH of 11.75 and a viscosity of 57 KU (measured using ASTM method D-562), was filtered through a coarse paint strainer, and then applied to the surfaces of 0.020 inch thick aluminum panels using an adjustable doctor blade to achieve a dry film thickness of 9 mils (average) on each panel. The coated panels were air-dried at room temperature (~77° F.) and 50% relative humidity for about 12 hours and then subjected to the following alternate curing steps:

A. baked at 250° for 1 hour

B. baked at 350° for 1 hour

C. baked at 500° for 1 hour

D. baked at 120° for 1 hour and then baked at 250° for 1 hour

E. baked at 120° for 1 hour and then baked at 350° for 1 hour

F. baked at 120° for 1 hour

The panels were then subjected to a direct flame of about 3500° F. generated at the apex of the inner cone of a Bernz-O-Matic® propane torch. An uncoated panel control burned through within 4 minutes. The coated panels did not burn through after 30 minutes, with the flame directed at the coated side of the panel. The reverse (uncoated side) burned through within 4 minutes.

The coated panels typically delayed penetration of the flame by over 700%. The following test results were obtained:

Panel Test Results

| Schedule | A | B | C | D | E | F |
|---|---|---|---|---|---|---|
| 12 hrs, 77° F. | X | X | X | X | X | X |
| 1 hr, 120° F. |   |   |   | X | X | X |
| 1 hr, 250° F. | X |   |   | X |   |   |
| 1 hr, 350° F. |   | X |   |   | X |   |
| 1 hr, 500° F. |   |   | X |   |   |   |
| Blistering | VSl | Cons | Cons | None | Sl | None |
| Adhesive Loss | None | Cons | Cons | None | Mod | None |
| Burn Through (mins) | ≧30 | a | a | ≧30 | ≧30 | ≧30 |

Key:
a = coating blistered and flaked off panel
V = very
Sl = slight
Cons = considerable
Mod = moderate Based on the results of this testing, it can be observed that in curing an aluminum substrate, the coating of the present invention effectively prevents burn-through of an aluminum panel when the coating is air-dried for 12 hours and then force-dried at a temperature of 120° F. for one hour. It is possible that further curing of the coating occurred in-situ during the test (from exposure to torch heat). It can also be observed that force-drying (i.e., baking) of the coating above 250° F. can result in undesired blistering of the coating.

Example 4

This example reports fuel savings in experiments using the coating of Example 1 in various applications.

Tests were conducted in a gas fired, down draft steel kiln, with a volume of approximately 56 ft$^3$. A cold dense charge was placed into the 2350° F. furnace, and heated to a steady state soak temperature. The furnace, in addition to a control thermocouple, was fitted with thermocouples on the outside of the refractory walls and in the waste gas flue. Gas usage was also monitored.

Figure 2:
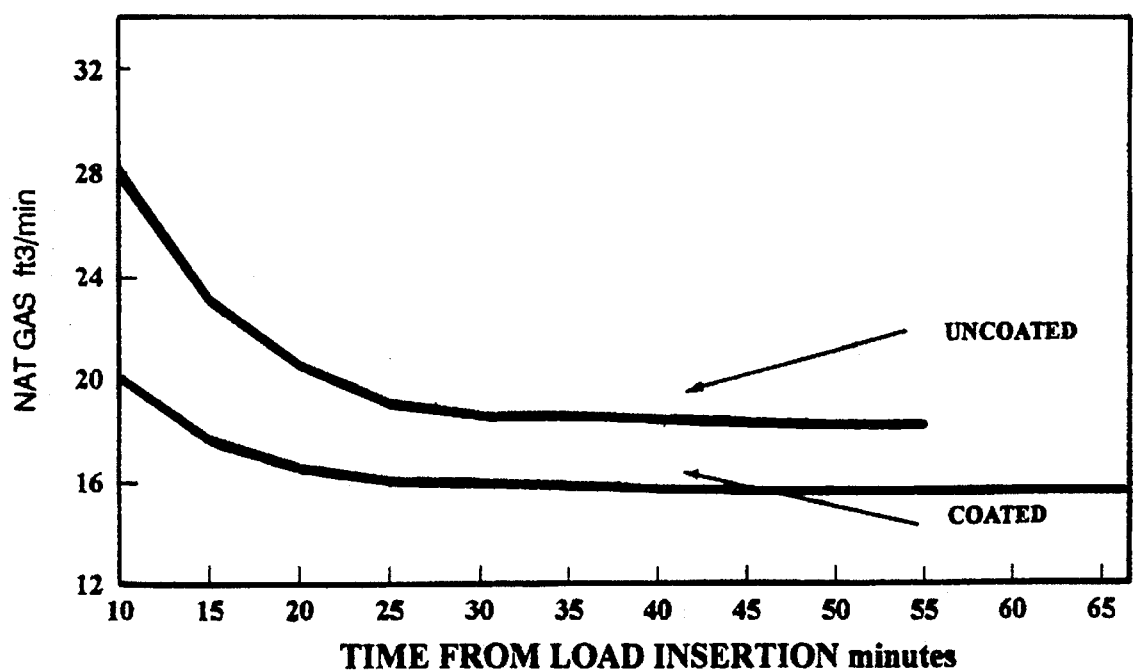
FIG. 2 is a plot of fuel (natural gas) consumption rate reduction in a furnace coated with a coating of the invention versus consumption in the same furnace prior to coating.

The furnace was first allowed to soak and reach equilibrium over many hours. A small wicket door was opened and the cold charge (also fitted with thermocouples) was introduced into the furnace. Gas flow and temperatures were recorded until the charge had reached equilibrium temperature. The charge was then removed and the furnace allowed time to recover before the whole process was repeated. After five replications of this process cycle, the furnace was allowed to cool and photon diffusive coating of Example 1 was sprayed into the inside refractory surface and then dried and baked out. The whole process cycle was again repeated a further four times after the coating application. A 200° F. drop in waste gas temperature and reduced gas flow rates were observed. The fuel consumption rate was reduced by 3 ft$^3$/minute, a 16% reduction. The results are plotted in FIG. 2.

Applied to one of two identical gas-fired shuttle kilns working at 2750°–2850° F., a 13 to 16% fuel saving was observed over a two year period. In an electric laboratory furnace operating at 2500° F., the measured drop of exterior temperature calculated the energy saving of the coated furnace to be 10%. Applied to soaking pits, a saving in fuel was achieved.

Example 5

This example reports data about Klannerite® itself.

A complete chemical analysis of Klannerite® is given below:

| Chemical Analysis, Calc. Basis | Amount |
|---|---|
| $SiO_2$ | 88.4% |
| $Al_2O_3$ | 10.6% |
| $TiO_2$ | 0.11% |
| $Fe_2O_3$ | 0.15% |
| MgO | 0.20% |
| CaO | 0.16% |
| MnO | 0.001% |
| $Na_2O$ | 0.23% |
| $K_2O$ | 0.07% |
| $Li_2O$ | 0.01% |
| $P_2O_5$ | 0.03% |
| S | 0.01% |
| Loss on Ignition | 4.09 |
| Loss on Drying | 2.7 |

A mineralogical composition is as follows:

| Mineral | Weight % | Density |
|---|---|---|
| Cristobalite | 42% | 2.32 |
| Tridymite | 18% | 2.26 |
| Quartz | 10% | 2.65 |
| Kaolinite | 30% | 2.62 |
| average density |   | 2.44 |

Semiquantification of the mineral phases by PLM was performed by point coint analysis. Powdered portions of the kalnnerite were immersed in refractive index liquids with $N_D$ values of 1.470 and 1.550. Mineral phases were characterized and identified on the basis of their optical properties. Once they were characterized, they were then point counted.

A minimum of 1,000 mineral grains were counted over four preparations with a polarizing light microscope equipped with a Chalkley point array ocular graticule. The results are shown below:

| Mineral Phase | Point Count Percent |
|---|---|
| alpha quartz | 13.05% |
| tridymite (high) | 18.01 |
| tridymite (low) | 3.22 |
| cristobalite (high) | 10.02 |
| cristobalite (low) | 41.91 |
| kaolinite, montmorillonite | 13.79 |

X-ray diffraction patterns of Klannerite®, analyzed on a Siemens D5000 x-ray defractometer (collected from 2° to 70° 2θ using CuK$_\alpha$ radiation, an acquisition time of 2.0 seconds per step and a step size of 0.05° 2θ, show a very high percentage of cristobalite (high and low temperature phases), tridymite (high and low temperature phases), alpha quartz, kaolinite, and montmorillonite. Petrography indicated that five silica polymorphs exist within the crystal matrix.

Scanning electron microscope studies on fractured surfaces of the rock and polished sections in different samples reveal many small crystallites present in the range of 1 to 3 microns, with considerable fine porosity observed. Polished sections reveal the presence of denser grains, which are surrounded by a more porous matrix type material. Mapping these areas of dense versus porous did not reveal any differences in elemental distribution. An iron oxide map did not show any indication of concentration variation.

The nature of the porosity was characterized by a mercury porisimeter. Ten percent of the pores were found to be larger than 10μ, 27% larger than 1 μm, and 59% larger than 0.1 μm, with 100% larger than 0.01 μm. The apparent porosity measured on three samples using a five-hour boil in water varied between 17 to 35%.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention as defined in the appended claims. The claims are meant to cover the claimed components and steps in any sequence which is effective to meet the objectives there intended, unless the context specifically indicates the contrary.

I claim:

1. A radiant energy reflective coating composition comprising (a) a naturally-occurring mineral containing alumina and at least about 65% silica, wherein at least about 60% of the silica is in the polymorphic crystalline form of cristobalite, reacted with sodium hydroxide, wherein the weight ratio of mineral to sodium hydroxide is between 4:1 and 5:1, and (b) a binder.

2. A composition according to claim 1 wherein the composition contains from about 85% to 90% silica, wherein at least about 70% of the silica is in the form of cristobalite, which is reacted with sodium hydroxide in an aqueous slurry by the application of heat.

3. A composition according to claim 2 wherein the reaction is carried out at about 120° F. to about 250° F. until the pH falls below about 12.

4. A composition according to claim 2 wherein the binder is a latex binder.

5. A composition according to claim 4 further comprising a polysaccharide resin.

6. A composition according to claim 5 further comprising a titanium dioxide opacifier.

7. A photon-diffusive coating composition comprising:
   (a) a product formed by the reaction between a ground mineral containing both about 85% to 90% silica in the polymorphic crystalline form of cristobalite in the amount of about 75% to 85%, and about 10% alumina, and sodium hydroxide in weight ratios of between 4:1 and 5:1 reacted in an aqueous slurry at elevated temperatures just under the boiling point until the pH of the slurry falls below about 12;
   (b) a polysaccharide resin; and
   (c) a latex binder.

8. A composition according to claim 7 wherein the elevated temperature is about 185° F. and the weight ratio between ground mineral and sodium hydroxide is 4.5:1.

9. A composition according to claim 7 further comprising a titanium dioxide opacifier added to the mineral-sodium hydroxide slurry prior to reaction at elevated temperatures.

10. A composition according to claim 9 wherein the weight ratio of mineral to opacifier ranges from about 5.5:1 to 4.5:1.

11. A composition according to claim 10 wherein the weight ratio of ground mineral to polysaccharide resin is from about 6:1 to 7:1 and the weight ratio of mineral to latex binder is from about 1:1 to 1.5:1.

12. A composition according to claim 11 wherein sodium sesquicarbonate is added to the composition prior to the latex binder, at a sodium hydroxide to sesquicarbonate weight ratio of between 25:1 and 35:1.

13. A composition according to claim 7 prepared by the process of:
   (a) reacting ground mineral and sodium hydroxide in a weight ratio of about 4.5:1 in an aqueous slurry held at about 185° F. until the pH of the slurry falls below about 12 with a titanium dioxide opacifier at a weight ratio of mineral to opacier ranging between about 4.5:1 to 5:1;
   (b) adding a polysaccharide resin to the mixture at a weight ratio of mineral to resin ranging from about 6:1 to about 6.5:1 and mixing;
   (c) adding sodium sesquicarbonate in a weight ratio of sodium hydroxide to sesquicarbonate ranging from about 25:1 to 30:1 and mixing; and
   (d) adding a latex binder in a weight ratio of mineral to binder ranging from about 1.5:1 to 1:1 and mixing.

14. A composition according to claim 13 cured by force-drying at an elevated temperature.

15. A method of making a photon-diffusive coating comprising combining a naturally-occurring mineral containing both about 85% to 90% silica in the polymorphic crystalline form of cristobalite in the amount of about 75% to 85%, and about 10% alumina, and sodium hydroxide in an aqueous slurry and subjecting the mixture to heat.

16. A method according to claim 15 wherein the mixture is subjected to heat just below the boiling point until the pH of the mixture falls below 12.

17. A method according to claim 16 wherein a binder is added to the mixture after the pH falls.

18. A method according to claim 17 wherein the binder comprises a polysaccharide resin and a latex binder.

* * * * *